Aug. 14, 1934.  H. E. MORTON  1,970,016
TOOL HOLDER
Filed Oct. 23, 1933
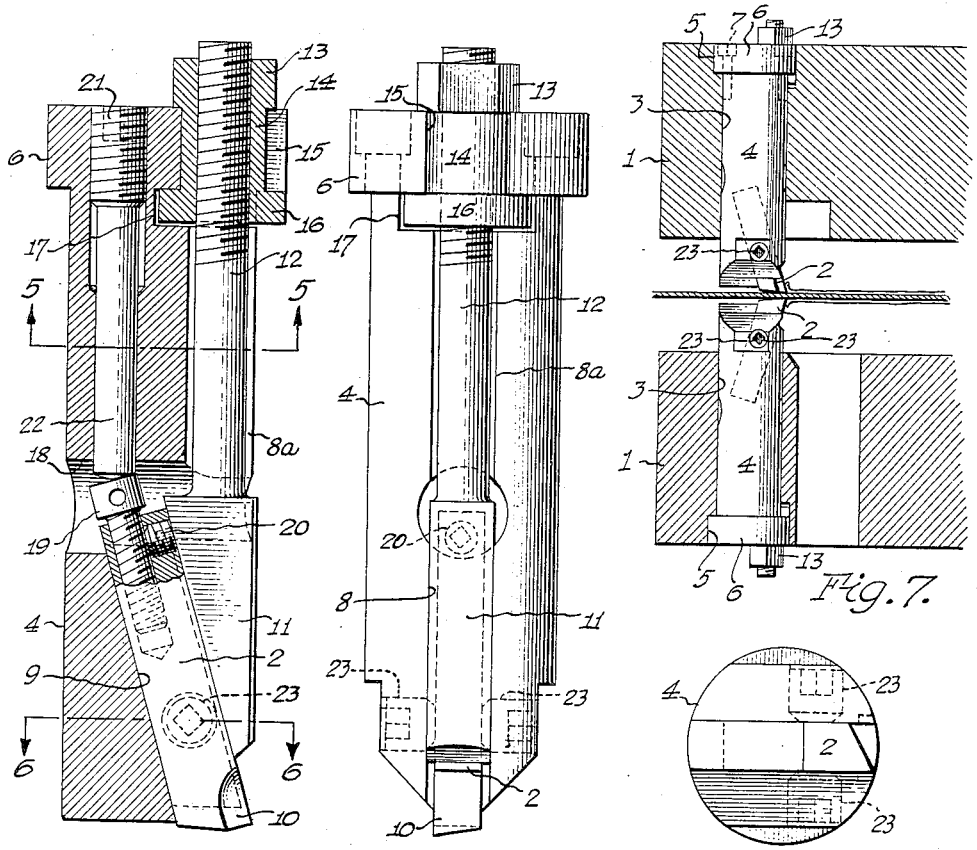
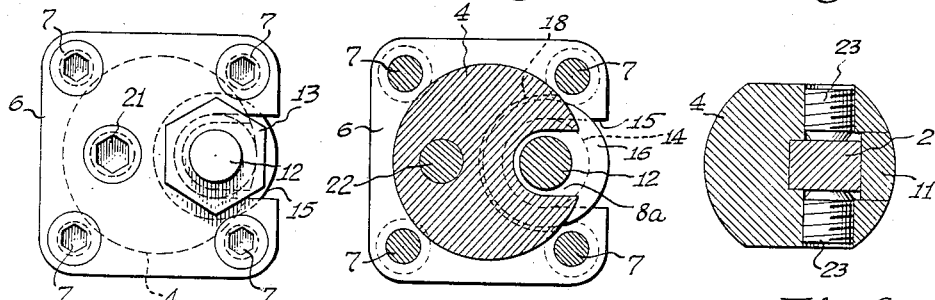
Fig.2.  Fig.1.  Fig.4.
Fig.3.  Fig.5.  Fig.6.
INVENTOR
Henry E. Morton,
BY
ATTORNEYS Patented Aug. 14, 1934

1,970,016

UNITED STATES PATENT OFFICE 1,970,016

TOOL HOLDER

Henry E. Morton, Muskegon Heights, Mich.

Application October 23, 1933, Serial No. 694,811

5 Claims. (Cl. 29—99)

This invention relates to a cutting tool or bit holder for metal working machines, and more particularly to heavy duty machines of the draw or push cut type wherein the tool is carried by a heavy reciprocable member.

An object of the present invention is to provide a tool holder applicable to the reciprocable member of such a machine, which holder, when secured in place, is non-vibratory, it becoming as rigid as the reciprocable member itself, and to provide a holder for the purpose, which may be readily and quickly detached and from which holder, the cutting tool or bit may be readily removed without detaching the holder, for the purpose of sharpening or replacing the tool.

A further object is to provide means on the holder for accurately setting the tool, together with adjustable means for accurately gauging the tool, said gauging means cooperating with said setting means in a manner whereby, when the tool is removed from its holder and ground to sharpen the same, said gauging means may be accurately adjusted to compensate for the grinding away of the tool, and the tool then replaced in the holder without further adjustment to maintain the depth of cut.

It is also an object to provide simple and quickly operable wedging means on the holder for rigidly seating and firmly holding the tool or bit in the holder, said wedging means also serving to firmly seat said holder within an opening in the ram or other carrier to which said holder is to be attached, and to provide certain other new and useful features, all as hereinafter set forth and more particularly pointed out in the appended claims, reference being had to the accompanying drawing in which:

Figure 1 is a side elevation of a holder illustrative of an embodiment of the present invention;

Fig. 2 is a longitudinal axial section of the same with internal parts shown in elevation and partly broken away and in section;

Fig. 3 is an end elevation of the upper end of the same;

Fig. 4 is an end elevation of the lower end thereof;

Figs. 5 and 6 are transverse sections substantially upon the lines 5—5 and 6—6 of Fig. 2; and Fig. 7 is a view illustrative of an application of the holder to the rams of a draw cut shaper, which rams are shown in section.

As illustrative of an application of the holder in use, duplicate holders are shown in Fig. 7 as applied to the parallel spaced apart rams 1 of a draw cut shaper and carrying bits or cutting tools 2 arranged for removing metal from the upper and lower sides of work, such as the flash from a welded seam of a sheet metal plate or the like. It will be understood however that the tool holder embodying the present invention may be applied as well to other types of machines having a rigid member adapted to be formed with a bore 3 of a diameter to receive the cylindrical body 4 of the holder, within which bore said body is adapted to fit closely, said bore being counterbored or the carrying member or ram 1 being otherwise formed at one end of said bore, with a recess 5 to receive an enlargement or head on what may be termed, the upper end of said body, this head being formed integral with the body as shown, or it may be formed of a separate piece secured to the end of the body, to fit closely within the recess 5 and to provide a projecting flange 6 formed with holes for bolts 7 by means of which said body may be detachably secured within the bore 3 against endwise movement therein. Therefore the holder as a whole may be readily detached from the ram 1 by removing the bolts 7 and slipping the holder endwise out of the bore 3.

The body 4 is formed radially inwardly from its side at its lower end with a slot 8 opening through said side and end, and this slot is formed at an angle to the longitudinal axis of the body, that is, it is deeper at its upper than at its lower end, to provide an inclined bottom surface 9 which forms a side seat for the tool or bit 2, which tool is of rectangular form in cross section and of extended length, being, as shown, substantially one-half the length of the body 4. This tool fits closely within the slot 8 and seats at its rear side upon the inner side or bottom of said slot which forms an inclined seat 9 therefor so that when so seated with its lower end projecting slightly from the lower end of said body, said tool will have the proper inclination to present its lower end at the proper cutting angle to the work, said end being ground in the usual manner to present a forward surface 10 inclined transversely to the line of cut and its end surface ground to provide a suitable relief rearwardly of the cutting edge.

To firmly and detachably hold said tool 2 in the slot 8 and firmly seated throughout its length upon its seat 9, a wedge member 11 fits closely in said slot between the outer inclined side of said tool and the wall of the bore 3 when the holder is in place, said wedge being formed with an inclined inner side to correspond with the inclination of said tool, and this wedge has a stem or shaft 12 integral with its upper end extending upwardly within an upward continuation 8a of said slot 8 which is of less depth than said slot, with the upper end portion of said stem screwthreaded to receive an adjusting nut 13, said nut being formed with a cylindrical body portion 14 to extend downwardly within a slot 15 in the head portion of the body 4, which slot is open through the side thereof in alignment with the slot 8a, and formed integral with the lower end of said nut body 14, is a circular flange 16 adapted to engage within a semi-circular recess 17 formed in the body adjacent and below the slot 15. With this arrangement, the wedge 11 may be moved up or down longitudinally into and out of contact with said tool, by turning the nut 13, the flange thereof preventing longitudinal movement of the nut body, and due to the location of the wedge 11, its stem 12 and nut 13 within said slots 8, 8a and 15, which slots open through the side of the body 4, when the holder is removed from the bore 3 of the ram, said parts may be easily detached, and as said wedge is arranged to wedge between the tool and the wall of the bore 3 when the holder is in place, by turning the nut 13, said wedge may be forced downwardly, crowding the tool firmly against its seat 9 and at the same time wedging the body 4 firmly within its bore 3 so that said body becomes, in effect, a solid part of the ram and the tool, a solid part of the body, thus preventing any vibration or chattering of the tool and holder relative to the ram, which chattering would, under the heavy strains imposed upon the tool during the cutting operation, tend to chip or break the hardened cutting edge of the tool.

The holder body 4 is bored or formed with a transverse opening at the upper end of the slot 8 and tool and wedge projecting from the upper end thereof to provide a chamber 18 into which said upper ends of said tool and wedge project, this chamber thus permitting longitudinal movement of the wedge and providing a space into which the head of a gauge screw 19 carried by the upper end of said tool, extends. The upper end of said tool is bored longitudinally inward and this bore screwthreaded to receive the gauge screw 19 which has a head or end formed with a preferably flat end surface and with a transverse opening to receive means for turning said screw. A lateral set screw 20 may be provided near the upper end of the tool to hold said gauge screw against turning after being set, and the holder body 4 is bored longitudinally inward from its upper end to receive a tool setting screw 21, the lower reduced end portion 22 of which fits in the bore and projects at its lower end into the chamber 18 in a position so that its end surface which is formed slightly conical to meet the plain end face of the head of the gauge screw 19, will form an abutment for said gauge screw and tool. The outer end of the bore of said setting screw 21, is screwthreaded to be engaged by the screwthreaded outer end portion of said setting screw and therefore said screw may be turned to adjust its lower end toward or from the end of the gauge screw on the tool. The lower projecting end of this screw 21 thus forms an adjustable abutment for the gauge screw so that in placing the tool in the holder with the gauge screw properly adjusted and in contact with such abutment, the tool will be set to make the desired depth of cut, and when it is desired to change such depth of cut, it is only necessary to adjust said screw 21. Further, should cutting tool 2, by reason of accumulation of dust or other particles become clogged, or for any reason become stuck in its seat, screw 21 may be removed, and by inserting through the bore therefor, a rod or drift tool, of suitable length, the tool may be driven from its seat.

In use, the tool 2 becomes dull and must be ground from time to time, and such grinding away of its lower end will change its depth of cut unless it be adjusted each time in its holder. With the present arrangement, the tool may be quickly removed from its holder without removing said holder from the ram, by simply loosening two set screws 23 which are screwed into the screwthreaded ends of a transverse bore in the body 4 with their inner ends in contact with the sides of the tool, and then adjusting the wedge 11 upwardly, releasing the tool, when it may be quickly removed and ground. After grinding, the gauge screw 19 will be adjusted to compensate for the grinding away of the lower or cutting end of the tool, the over-all distance between the cutting edge and the upper end surface of the gauge screw being thus maintained, so that when the tool is again placed in its holder with its gauge screw in contact with the lower conical surface of the setting or abutment screw, proper depth of cut will be insured.

With this arrangement of gauge screw carried by the tool and by making the tool of extended length, repeated grinding of the tool may be performed and the gauge screw quickly adjusted to compensate for each grinding operation, such grinding and setting of the tool being facilitated as such adjustment to maintain overall length of tool is readily and accurately made while the tool is detached from its holder, and said tool may be quickly inserted in its holder without further adjustment by seating the tool in its slot with the head of its gauge screw in contact with the abutment or lower end of the setting screw 21. Further by this arrangement after one half inch has been removed from the length of the tool by repeated grindings, the gauge screw 19 may be removed from the tool and one which is one half inch greater in length substituted therefor, so that another half inch may be ground from the tool before it need be discarded, and it need not then be discarded if the screw 21 be adjusted inwardly a definite distance, as for instance, screwing it inwardly, ten complete turns where said screw is provided with twenty threads to the inch. This procedure not only greatly prolongs the life of the tools but production of the machine is thus greatly increased due to the facility with which the tool may be removed without removing its holder or changing the setting, then adjusted and again inserted in its holder, and by having an extra tool ready for insertion while the one taken out is being ground, operation may be further expedited.

Obviously the device embodying the present invention may be applied to any of the various types of machines requiring a fixed cutting tool and having a tool carrying member which may be formed with a bore to receive the present holder, and obviously various changes may be made in the holder and tool to suit the various conditions of installation and operation without departing from the spirit of the invention. I do not, therefore, limit myself to the particular construction or arrangement shown.

Having thus fully described my invention, what I claim is:—

1. A tool holder including a body adapted to be detachably secured within an opening in a member of a machine for carrying a cutting tool, said body being formed with a slot opening through an end of said body, a tool of extended length in said slot, adjustable means on the upper end of said tool to change the over-all length of said tool, adjustable means carried by said body and forming an abutment for said adjustable means on the inner end of said tool, and means within said slot for forcing said tool laterally against the bottom of said slot to detachably hold said tool to its seat.

2. A tool holder including a body adapted to be detachably secured within an opening in a member of a machine for carrying a cutting tool, said body being adapted to fit closely throughout its length in said opening and being formed with a slot extending inwardly from one side thereof and opening through the lower end of said body, a tool of extended length seated against the bottom of said slot with its lower cutting end projecting from the lower end of said body, and a wedge member in said slot between the outer side of said tool and the wall of the opening in which said body is mounted, and means extending through the upper end of said body for adjusting said wedge member longitudinally of said body, said tool and wedge member being removable through the open side of said slot when said body is removed from said opening in the machine member in which it is mounted.

3. A tool holder comprising a body adapted to be detachably secured within an opening in a member of a machine for carrying a cutting tool, said body being formed with a slot extending inwardly from one side and opening through the lower end thereof, said slot having a bottom inclined to the longitudinal axis of said body to form a tool seat, a tool of extended length seated throughout its length on said seat, a wedge member in said slot above the outer side of said tool and having a longitudinally inclined side to engage said tool throughout a major portion of its length and a straight side to engage the wall of the opening opposite said slot in which said body is mounted, and means extending through the upper end of said body for adjusting said wedge member longitudinally of said body.

4. A tool holder as characterized in claim 3 and including adjustable means on the upper end of said tool to adjust the over-all length of said tool, and an adjustable member mounted in said body and extending through the upper end thereof, forming an abutment at its lower end to be engaged by said means on the upper end of said tool.

5. A tool holder comprising a cylindrical body adapted to fit within a bore in a member of a machine adapted to carry a cutting tool, said body being formed at its lower end with a slot open through the side and end of the body with the bottom of said slot inclined upwardly from said end of said body relative to the longitudinal axis thereof and forming an internal seat of extended length, a tool of extended length seated at one side against said seat, an adjustable gauge screw on the upper end of said tool, a setting member in a longitudinal bore of said body extending through the upper end thereof with its lower end opposed to said gauge screw, a wedge member in said slot between said tool and the wall of the bore in which the body is mounted, a stem on said member extending through the upper end of said body and lying within an extension of said slot opening through the side of said body, and adjustable means on the upper end of said stem operatively engaged with said body to prevent longitudinal movement thereof and free to turn relative to said body to adjust said stem and member longitudinally of said body.

HENRY E. MORTON.